United States Patent
Nakamura

(10) Patent No.: US 8,401,299 B2
(45) Date of Patent: Mar. 19, 2013

(54) CHARACTER LINE RECOGNITION METHOD AND CHARACTER LINE RECOGNITION DEVICE

(75) Inventor: Hiroshi Nakamura, Nagano (JP)

(73) Assignee: Nidec Sankyo Corporation (JP)

(*) Notice: Subject to any disclaimer, the term of this patent is extended or adjusted under 35 U.S.C. 154(b) by 672 days.

(21) Appl. No.: 12/623,826

(22) Filed: Nov. 23, 2009

(65) Prior Publication Data

US 2010/0135578 A1    Jun. 3, 2010

(30) Foreign Application Priority Data

Nov. 23, 2008    (JP) ................... 2008-298875

(51) Int. Cl.
*G06K 9/46*    (2006.01)
*G06K 9/66*    (2006.01)

(52) U.S. Cl. .................... 382/190; 382/229; 382/270

(58) Field of Classification Search .......... 382/172, 382/177, 190, 229, 270
See application file for complete search history.

(56) References Cited

U.S. PATENT DOCUMENTS

| | | | | |
|---|---|---|---|---|
| 5,637,578 A * | 6/1997 | Riley et al. | ..................... | 514/186 |
| 5,825,920 A * | 10/1998 | Kitamura et al. | ............. | 382/178 |
| 6,240,205 B1 * | 5/2001 | Fan et al. | ....................... | 382/173 |
| 6,282,314 B1 * | 8/2001 | Sugiura et al. | ................ | 382/173 |
| 2010/0220930 A1* | 9/2010 | Sun et al. | ....................... | 382/190 |

FOREIGN PATENT DOCUMENTS

| | | |
|---|---|---|
| JP | 9-16715 A | 1/1997 |
| JP | 10-222602 A | 8/1998 |
| JP | 2004-118611 A | 4/2004 |

* cited by examiner

*Primary Examiner* — John Strege
(74) *Attorney, Agent, or Firm* — Cantor Colburn LLP

(57) ABSTRACT

A character line recognition method for processing image data obtained by scanning a character line on a medium to recognize the character line may include processing the image data into monochrome binary format image data by using a predetermined binarization standard threshold; extracting character features from each character that composes the character line to calculate similarity with respect to standard character features; temporarily determining characters based on the similarity; calculating basic statistics of the similarity for all the characters which have been temporarily determined; and changing the binarization standard threshold based on the basic statistics and then returning to the processing the image data.

10 Claims, 15 Drawing Sheets

Fig. 3

P<JPNSANKYO<<HANAKO<BCDEFGILMQRTUVWXYZ<<<<<
0987654326JPN8503172F1210082<<<<<<<<<<<<<<6

| Result from cycle 1 \ Result from cycle 2 | Category 1 (C1) | Category 2 (C2) | Category 3 Score2 < K (C3) | Category 4 Score2 ≧ K (C4) |
|---|---|---|---|---|
| Category 1 (C1) | T − D (Q11) | T + 2 D (Q21) | T + 2 D (Q31) | E N D |
| Category 2 (C2) | T − D (Q12) | Score2 ≧ Score1: T + 2 D (Q22) Score2 < Score1: T − D (Q23) | T + 2 D (Q32) | E N D |
| Category 3 (C3) Score1 < K | T − D (Q13) | T − D (Q24) | Score2 ≧ Score1: T + 2 D (Q33) Score2 < Score1: T − D (Q34) | E N D |
| Category 4 (C4) Score1 ≧ K | | | | |

Fig. 12(b)

| Processing code | Result from cycle 3 | Category 1 (C1) | Category 2 (C2) | Category 3 Score3 < K (C3) | Category 4 Score3 ≧ K (C4) |
|---|---|---|---|---|---|
| | Q 11 | 3 | 3 | | 3 |
| | Q 12 | 1 | 1 or 3 | 3 | 3 |
| | Q 13 | 1 | 1 | 1 or 3 | 3 |
| | Q 21 | 2 | 2 or 3 | 3 | 3 |
| | Q 22 | 2 | 2 or 3 | 3 | 3 |
| | Q 23 | 1 | 1 or 3 | 3 | 3 |
| | Q 24 | 1 | 1 | 1 or 3 | 3 |
| | Q 31 | 2 | 2 | 2 or 3 | 3 |
| | Q 32 | 2 | 2 | 2 or 3 | 3 |
| | Q 33 | 2 | 2 | 2 or 3 | 3 |
| | Q 34 | 1 | 1 | 1 or 3 | 3 |

Fig. 13(a)

| Result from cycle 1 \ Result from cycle 2 | Category 1 (C1) | Category 2 (C2) | Category 3 Score2 > K (C3) | Category 4 Score2 ≦ K (C4) |
|---|---|---|---|---|
| Category 1 (C1) | T − D (Q11) | T + 2 D (Q21) | T + 2 D (Q31) | E N D |
| Category 2 (C2) | T − D (Q12) | Score2 ≦ Score1<br>T + 2 D (Q22)<br>Score2 > Score1:<br>T − D (Q23) | T + 2 D (Q32) | E N D |
| Category 3 (C3) Score1 > K | T − D (Q13) | T − D (Q24) | Score2 ≦ Score1:<br>T + 2 D (Q33)<br>Score2 > Score1:<br>T − D (Q34) | E N D |
| Category 4 (C4) Score1 ≦ K | | | | |

Fig. 13(b)

| Processing code | Result from cycle 3 | Category 1 (C1) | Category 2 (C2) | Category 3 Score3 > K (C3) | Category 4 Score3 ≤ K (C4) |
|---|---|---|---|---|---|
| | Q11 | 3 | 3 | 3 | 3 |
| | Q12 | 1 | 1 or 3 | 3 | 3 |
| | Q13 | 1 | 1 | 1 or 3 | 3 |
| | Q21 | 2 | 2 or 3 | 3 | 3 |
| | Q22 | 2 | 2 or 3 | 3 | 3 |
| | Q23 | 1 | 1 or 3 | 3 | 3 |
| | Q24 | 1 | 1 | 1 or 3 | 3 |
| | Q31 | 2 | 2 | 2 or 3 | 3 |
| | Q32 | 2 | 2 | 2 or 3 | 3 |
| | Q33 | 2 | 2 | 2 or 3 | 3 |
| | Q34 | 1 | 1 | 1 or 3 | 3 |

CHARACTER LINE RECOGNITION METHOD AND CHARACTER LINE RECOGNITION DEVICE

CROSS REFERENCE TO RELATED APPLICATIONS

The present application claims priority under 35 U.S.C. §119 to Japanese Application No. 2008-298875 filed Nov. 23, 2009, the entire contents of which are incorporated herein by reference.

TECHNICAL FIELD

The present invention relates to a character line recognition method and a character line recognition device for optically reading a character line on a medium such as paper or plastic.

BACKGROUND

There are conventional devices for recognizing character lines printed on media surfaces such as personal checks. For example, well-known are character recognition devices in which a character portion is detected from binary image data, the character portion is segmented along the bounding rectangular frame, character features are extracted from the obtained character pattern, the similarity between the feature vector of the input pattern and a standard vector for each character in the feature dictionary is obtained, and a character candidate is selected according to the degree of similarity.

Among such character recognition devices is one provided with various measures for re-binarization based on the recognition result in order to improve the recognition accuracy (see Patent References 1 through 3, for example).

More specifically described, in the technology disclosed in Patent Reference 1, it is judged according to the result of the character recognition and the counting result of the black points whether it is necessary to re-binarize the gray-scale image; if it is necessary, a threshold different from the original threshold is set and the gray-scale image is binarized using the new threshold. In the technology disclosed in Patent Reference 2, when a correct recognition result could not be obtained under the initial binarization condition, the filter or the threshold is changed based on the result of the total number of pixels having the same value and then the process from the preceding processing to the recognition processing is re-run. In the technology disclosed in Patent Reference 3, when the score which is the basis of the individual pattern comparison result is in a warning judgment frame which is set based on the sequential statistical processing result, the pickup system and the threshold are changed and then the process from the scanning to the recognition processing is rerun.

[Patent Reference 1] Japanese Patent Application H09-016715 Unexamined Publication
[Patent Reference 2] Japanese Patent Application H10-222602 Unexamined Publication
[Patent Reference 3] Japanese Patent Application 2004-118611 Unexamined Publication However, in the technology disclosed in Patent Reference 1 only those results that do not satisfy the allowance range are re-binarized, but the judgment as to whether the threshold on the whole is appropriate or not is not performed; therefore, a question arises as to whether the recognition result is reliable enough. Also, the technology disclosed in Patent Reference 2 is also locally applied to only the characters that were not read, which is in the same manner as the Patent Reference 1; therefore, it is not sufficient to improve the reliability of the recognition result on the whole. Note that the technology disclosed in Patent Reference 3 re-scans the image, which is contrary to the demand for speedy processing.

SUMMARY OF THE INVENTION

In view the above problems, and at least an embodiment of the present invention provides a character line recognition method and character line recognition device by which the reliability of the character line recognition, especially the recognition result of the character line on the whole, can be improved.

To achieve the above, at least an embodiment of the present invention provides the following.

(1) A character line recognition method for processing image data obtained by scanning a character line on a medium to recognize the character line, comprising a processing step for processing the image data into monochrome binary format image data by using a predetermined binarization standard threshold, a similarity calculation step for extracting character features from each character composing the character line to calculate similarity with respect to standard character features, a temporary character judgment step for temporarily determining characters based on the similarity, a basic statistical calculation step for calculating the basic statistics of said similarity for all the characters which have been temporarily determined in the temporary character judgment step, and a process-returning step for changing said binarization standard threshold based on the basic statistics which have been calculated in the statistics calculation step and then returning the process to the initial processing step.

According to at least an embodiment of the present invention, the character line recognition method includes a series of processing steps in which the image data obtained by scanning a character line on a medium is processed into monochrome binary format image data by using a predetermined binarization standard threshold, character features are extracted from each character composing the character line to calculate similarity with respect to standard character features, characters are temporarily determined based on the similarity, a basic statistics of the similarity for all the characters which have been temporarily judged in the temporary character judgment step is calculated, and the binarization standard threshold is changed based on the basic statistics which have been calculated in the statistics calculation step and then the process returns to the step where the image data is processed. Therefore, reliability for the recognition result of the character line recognition can be increased.

In other words, when the basic statistical calculation does not return an appropriate value after the temporary character judgment is performed, the binarization standard threshold is changed and then a series of processing steps can be performed again; therefore, it can be determined whether or not the binarization standard threshold is appropriate on the whole, resulting in increased reliability. Particularly, at least an embodiment of the present invention has a particular effect on increasing reliability for the recognition results of the character line on the whole (the recognition result of the character line recognition) rather than on increasing the recognition result of individual character recognition. Note that, since rescanning of the image may not be required in the present invention, the processing time is kept to a minimum.

"The binarization standard threshold" is the threshold used for obtaining monochromatic binary format image data. Also, for obtaining image data by scanning a character line on a medium, any means such as a 1D pickup device or 2D CCD may be used.

(2) The character line recognition method further comprising a projection calculation step for calculating an orthogonal projection of the binary format data in a direction orthogonal to the direction of the character line while shifting along the binary format image data in the direction of the character line between the end of the processing step and the similarity calculating step, a segmenting-position detection step for detecting positions at which orthogonal projection data obtained in the projection calculation step is above a predetermined boundary judgment threshold as the positions for segmenting characters that compose the character line, and a bounding rectangle calculation step for obtaining rectangles bounding the characters based on the segmenting-positions detected in the segmenting-position detection step; wherein the similarity calculation step extracts character features in the rectangle and calculates similarity with respect to the standard character features.

At least an embodiment of the present invention includes the processing in which an orthogonal projection of the binary format data in a direction orthogonal to the direction of the character line is calculated while shifting along the binary format image data in the direction of the character line between the end of the processing step and the similarity calculation step, positions at which the orthogonal projection data obtained in the projection calculation slap is above a predetermined boundary judgment threshold are detected as the positions for segmenting the characters that compose the character line, and rectangles bounding the characters are obtained based on the segmenting-positions. And the character features inside of the rectangle are extracted to perform the above mentioned similarity calculation step; therefore, even in a character line recognition device in which image data is obtained by a 1D pickup device or a linear transporting mechanism, reliability for the recognition result of the entire character line on the whole can be increased.

"The boundary judgment threshold" mentioned here is a threshold used for detecting the character segmentation positions, different from the above-mentioned "binarization standard threshold".

(3) The character line recognition method in which the process-returning step classifies [the recognition result] into one of the multiple evaluation categories based on the basic statistics calculated in the basic statistical calculation step, and changes the binarization standard threshold based on the evaluation category in which the recognition result is classified.

According to at least an embodiment of the present invention, in the above-mentioned process-returning step the recognition result is classified into one of the multiple evaluation categories based on the basic statistics calculated in the basic statistical calculation step and the binarization standard threshold is changed based on the evaluation category in which the recognition result is classified. Therefore, if a table of a plurality of evaluation categories is prepared in advance (is stored in a memory medium, for example), the binarization standard threshold can be changed easily, and reliability for the recognition result on the whole can be increased easily.

(4) The character line recognition method in which, taking a minimum value of the similarity as the basic statistics, the process-returning step classifies the recognition result into one of the evaluation categories according to the minimum value.

According to at least an embodiment of the present invention, in the above-described process-returning step, taking a minimum value of the similarity as the basic statistic calculated in the basic statistical calculation step, the recognition result is classified into one of the evaluation categories according to the minimum value; therefore, by using the simple number of the minimum value, reliability for the recognition result can be further increased easily.

(5) The character line recognition method in which the aforementioned binarization standard threshold is changed so as to improve the basic statistics calculated in the basic statistical calculation step.

According to at least an embodiment of the present invention, in the above-described process-returning step, the binarization standard threshold is changed so as to improve the basic statistics calculated in the basic statistical calculation step; therefore, while the basic statistics are utilized at their maximum, the binarization standard threshold can be changed.

(6) A character line recognition method for processing image data obtained by scanning a character line on a medium to recognize the character line, comprising a processing step for processing the image data into monochrome binary format image data by using a predetermined binarization standard threshold, a similarity calculation step for extracting character features from each character composing the character line to calculate similarity with respect to standard character features, a temporary character judgment step for temporarily judging the character based on the similarity, an evaluation category classification step for classifying the recognition result of the entire character line on all the characters temporarily judged in the temporary character judgment step (the recognition result of the character line recognition) into one of a plurality of evaluation categories, and a process-returning step for changing the binarization standard threshold based on the evaluation category in which the recognition result is classified and then returning the process to the initial processing step.

According to at least an embodiment of the present invention, included in the character line recognition method is a series of processing steps in which image data obtained by scanning a character line on a medium is processed into monochrome binary format image data by using a predetermined binarization standard threshold, character features are extracted from each character composing the character line to calculate similarity with respect to the standard character features, characters are temporarily determined based on the similarity, the recognition result of the entire character line on all the characters temporarily judged is classified into one of a plurality of evaluation categories, and the binarization standard threshold is changed based on the evaluation category in which the recognition result is classified and then the process is returned to the step in which the image data is processed; therefore, reliability for the recognition result of the character line recognition process can be increased.

(7) The character line recognition method in which the aforementioned process-returning step changes the binarization standard threshold to be used in the re-processing after this process-returning step based on the results from the repeated processing step, similarity calculation step and temporary character judgment step, so as to improve the recognition result of the entire character line.

According to at least an embodiment of the present invention, the above-described process-returning step changes when the binarization standard threshold to be used in the re-processing after this process-returning step, based on the results from the repeated processing step, similarity calculation step and temporary character judgment step, so that the recognition result of the entire character line can be improved; therefore, reliability for the recognition result of the character line recognition process can be increased.

(8) The character line recognition method further comprising a basic statistical calculation step for calculating the basic statistics of the aforementioned similarity of all the characters which have been temporarily judged in the temporary character judgment step, wherein the process-returning step changes the binarization standard threshold based on the evaluation category of the recognition result given in the evaluation category classification step and the basic statistics calculated in the basic statistical calculation step.

According to at least an embodiment of the present invention, the character line recognition method further comprises a basic statistical calculation slap for calculating the basic statistics of the aforementioned similarity of all the characters which have been temporarily judged in the temporary character judgment step, wherein the process-returning step changes the binarization standard threshold based on the evaluation category of the recognition result given in the evaluation category classification step and the basic statistics calculated in the basic statistical calculation step; therefore, based on both the evaluation category and the basic statistics, reliability for the recognition result of the character line recognition can be further increased.

(9) The character line recognition method in which the process-returning step changes the binarization standard threshold so as to improve the basic statistics calculated in the basic statistical calculation step.

According to at least an embodiment of the present invention, the aforementioned process-returning step changes the binarization standard threshold so as to improve the basic statistics calculated in the basic statistical calculation step; therefore, while the basic statistics are utilized at their maximum, the binarization standard threshold can be changed.

(10) A character line recognition device equipped with a character line recognition means to recognize a character line on a medium by using the character line recognition method in any of (1) through (9).

According to at least an embodiment of the present invention, by using the above-described character line recognition method, a character line recognition device equipped with a character line recognition means to recognize a character line on a medium, can be provided.

According to and embodiment of the character line recognition method and the character line recognition device, basic statistics are used to determine whether the binarization standard threshold is appropriate on the whole; therefore, reliability for the recognition result of the character line recognition can be easily increased. Also, there is no need to re-scan the image, thus preventing long processing time.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 3 is an example of image data obtained by scanning characters printed in an OCR character storage area on a recording carrier (see FIG. 1).

FIG. 8 is a histogram of positive peaks in the orthogonal projection data shown in

FIG. 7.

FIG. 12 is an explanatory table to explain how the binarization standard threshold is changed based on a plurality of evaluation categories in the second and subsequent cycles.

FIG. 13 is another example of an evaluation category table.

DETAILED DESCRIPTION OF PREFERRED EMBODIMENTS

Figure 1:
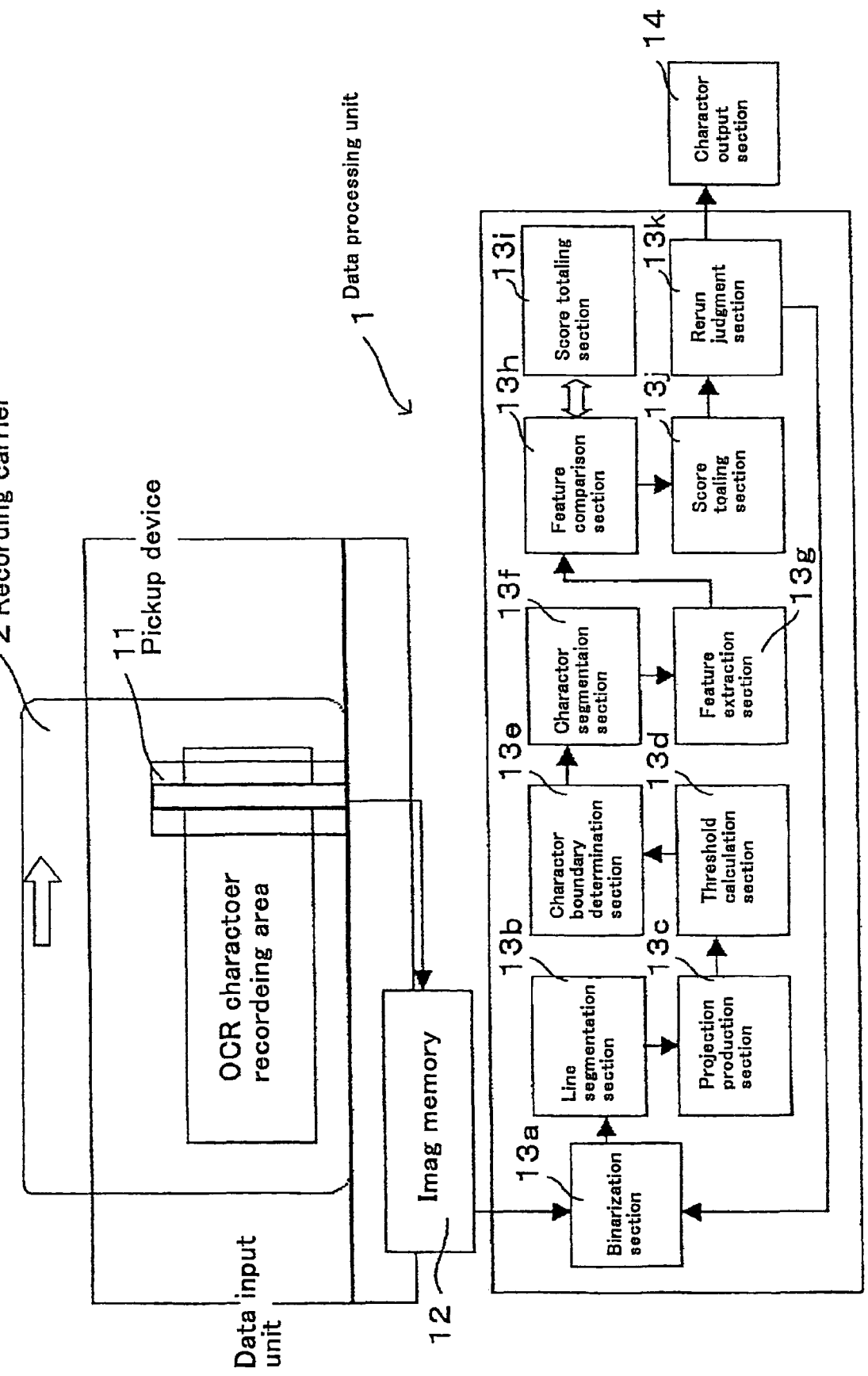
FIG. 1 is a block diagram showing an electrical configuration of a character line recognition device of an embodiment.

Embodiments of the present invention will be described hereinafter referring to the drawings.

Character Line Recognition Device

FIG. 1 is a block diagram showing an electrical configuration of a character line recognition device 1 of an embodiment of the present invention.

In FIG. 1, a character line recognition device 1 has a close-contact (1D) image pickup device 11, an image memory 12, a data processing unit 13, and a character output unit 14 (such as a monitor). Also, the data processing unit 13 includes a binarization section 13*a*, a line segmentation section 13*b*, a projection generation section 13*c*, a threshold calculation section 13*d*, a character boundary decision section 13*e*, a character segmentation section 13*f*, a feature extraction section 13*g*, a feature comparison section 13*h*, a feature dictionary-storage section 13*i*, a score totaling section 13*j*, and a re-run judgment section 13*k*. Note that each of these sections functions as part of a character line recognition method for recognizing a character line on a recording carrier 2. Also, these sections can be realized in hardware form by an electrical element such as a CPU, MPU, RAM or ROM.

The image pickup device 11 scans an OCR character line on the recording carrier 2 and performs photoelectrical conversion on the OCR character line. The image data obtained through the conversion is taken into the image memory 12 temporarily. Then, the data processing unit 13 reads the image data out of the image memory 12 and performs the various processing steps in the sections as mentioned above to finally recognize the OCR character line on the recording carrier 2.

The recording carrier 2 may be a general JIS standard card; it may be a plastic card, ID card, passport book or a driver's license 86 mm(W)×54 mm(H)×0.76 mm(D) in size, for example.

Character Line Recognition Method

Figure 2:
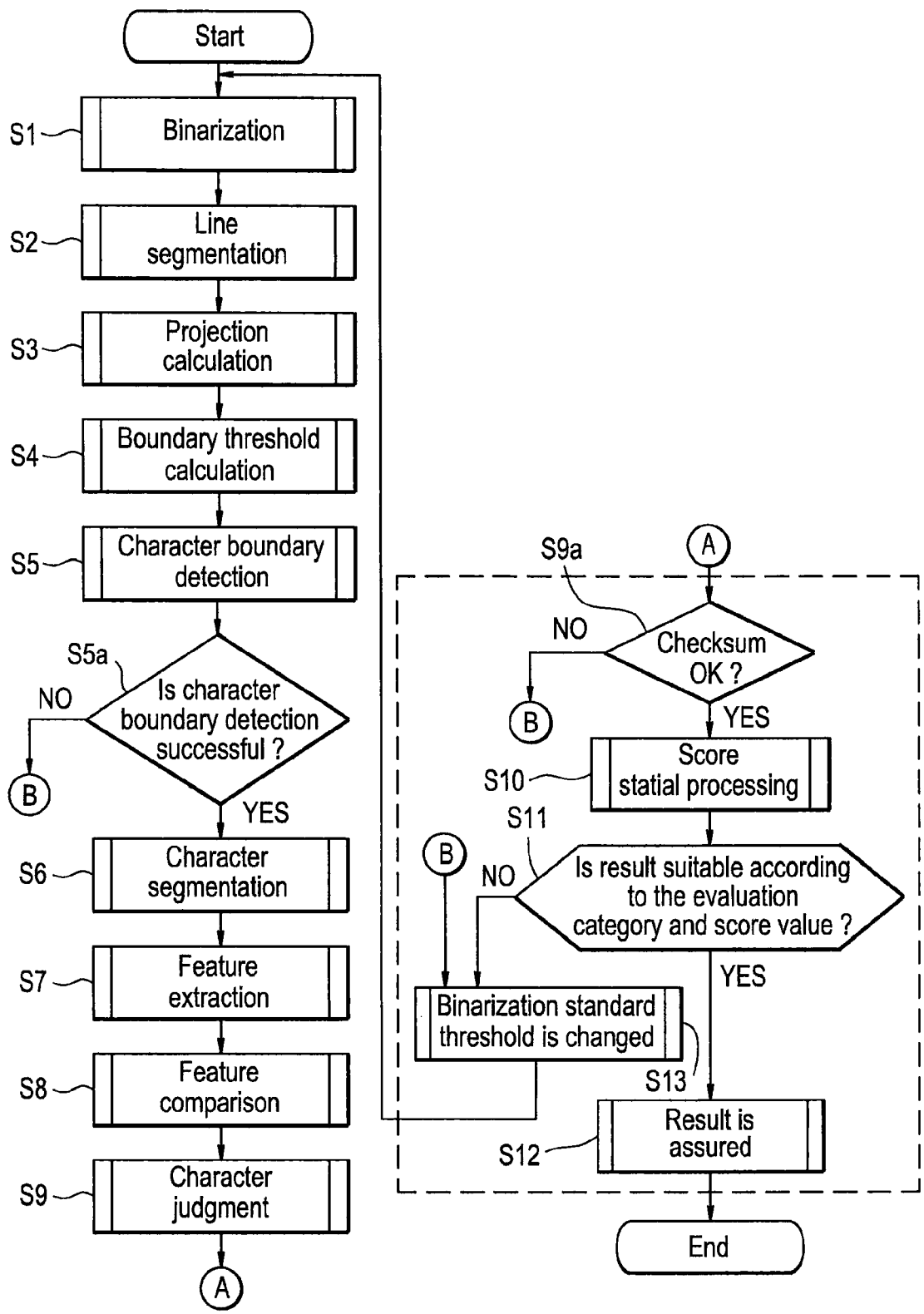
FIG. 2 is a flowchart of the character line recognition method of the embodiment.

FIG. 2 is a flowchart of a character line recognition method of an embodiment of the present invention. Note that, although a projection calculation (step S3) and a character segmentation (Step S6), which will be described later, are performed on the image data obtained by using the above-mentioned 1-D image pickup device 11 in this embodiment, the determined processing (Step S2 through Step S6) may be omitted for some cases.

As shown in FIG. 2, in the character line recognition method of this embodiment, a binarization processing is first performed (Step S1). More specifically, in the binariation section 13a of the data processing unit 13, the image data is read from the image memory 12; when the image data is a multi-gradation gray image, the image data is converted to a monochromatic binary format image (binary image data). Note that the image memory 12 can be any of RAM, SDRAM, DDRSDRAM or RDRAM as long as the image data can be stored in it. Also, Step S1 is an example of the "processing step" in which the image data is processed into monochromatic binary image data by using a predetermined binarization standard threshold.

Next, the line segmentation is performed (Step 2). More specifically described, in the line segmentation section 13b of the data processing unit 13, the binarized character line is projected in a horizontal direction to detect the upper and lower edges of the character line. Then, the center position between the upper and lower edges is identified as the center line of the character line for segmentation.

Then, a projection calculation is performed (Step S3). More specifically described, in the projection generation section 13c of the data processing unit 13, a projection calculation (intensity projection) is performed on the image data (binary image data) for each character line detected in Step S2 in the direction orthogonal to the character line. This processing step is necessary to search for the character-segmenting positions in the horizontal direction in each character line.

Note that Step S3 is an example of the "projection calculation step" in which, while shifting along the binary image data in the direction of the character line, the orthogonal projection of the binary image data in a direction orthogonal to the direction of the character line, is calculated. Also, the intensity projection is a kind of histogram (intensity distribution map) in which the pixels transformed to the intensity of "1" or "0" through binarization are summed for each intensity; the sum value of either white or black can be used for calculation, It is needless to say that the intensity projection may be replaced with a luminosity projection. The calculation is set up so that addition of the pixels in the perpendicular direction with respect to the horizontal axis (X axis) is performed within the range having the character line upper and lower edges (+α) obtained in the line segmentation in Step 2 as both end points.

Described here is an example of Step 3. FIG. 3 shows the image data obtained by scanning the characters printed in the OCR character recording region on the recording carrier 2 (see FIG. 1). Also, FIG. 4 shows a result (an example) of the orthogonal projection of the image data of FIG. 3 (either top row or bottom row).

Figure 4:
FIG. 4 is an example of the result of the orthogonal projection of the image data shown in FIG. 3.

As shown in FIG. 4, the character line length (the number of pixels between both ends of the character line) is the number of the pixels from the Ps point to the Pe point in the orthogonal projection data. The number of pixels from the Ps point to the Pe point is closely related to the swiping speed of the recording carrier 2. In other words, when the swiping speed is slow, the number of pixels is more (sufficient resolution can be obtained); on the other hand, when the swiping speed is fast, the number of pixels is fewer.

Figure 5:
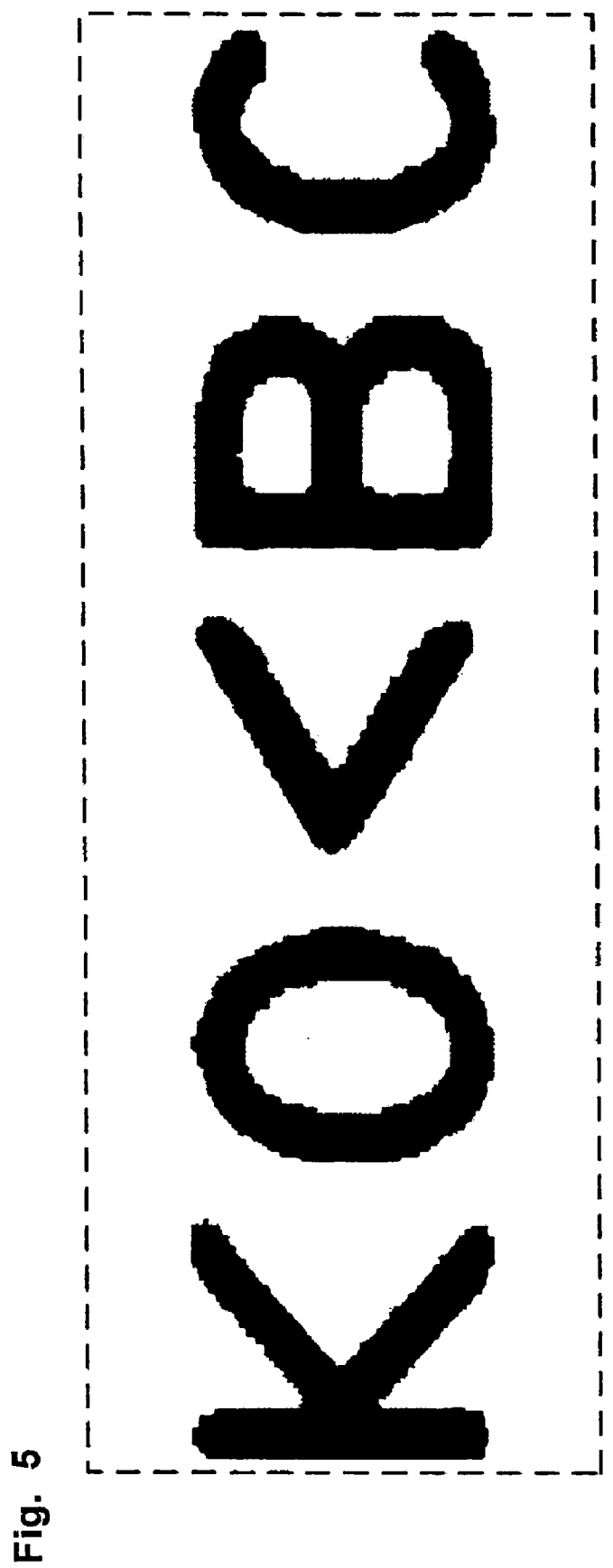
FIG. 5 is the image data of the characters, "KO<BC", part of the character line.
Figure 6:
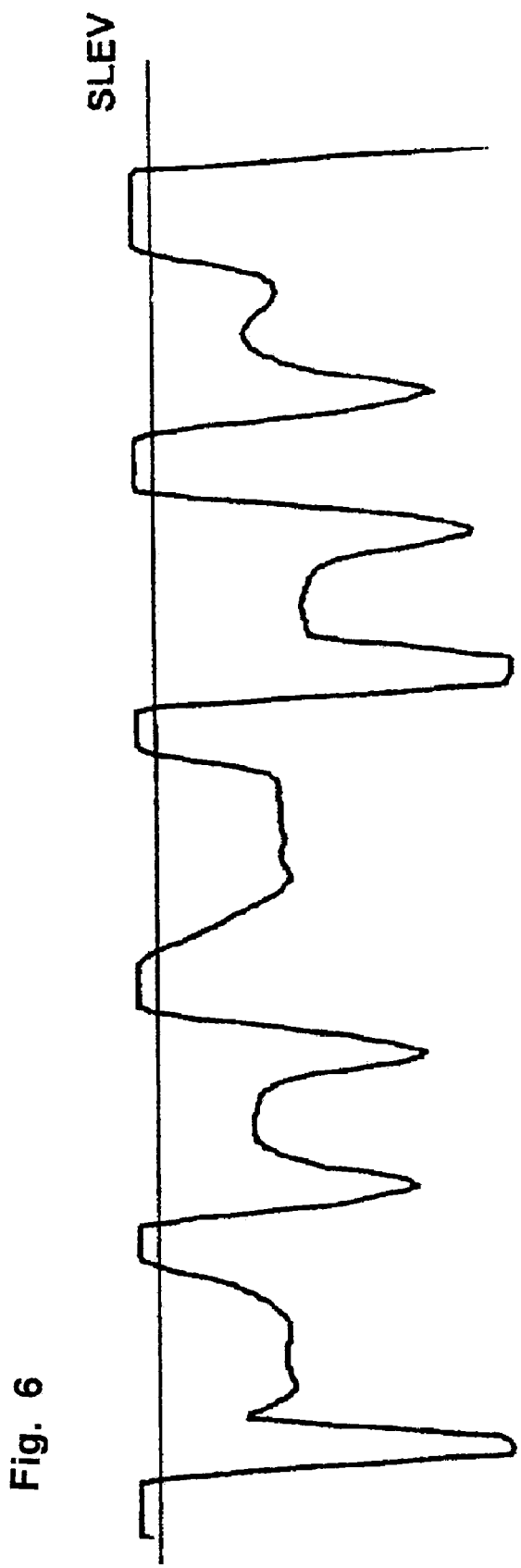
FIG. 6 is an example of the orthogonal projection data obtained by orthogonally projecting the image data shown in FIG. 5.

FIG. 5 shows the image data of the character "KO<BC" which is part of the character line. Also, FIG. 6 is the orthogonal projection data (the example) obtained by orthogonally projecting the image data of FIG. 5. Note that FIG. 5 shows the image data from "K" to "C" in FIG. 3.

Next, a threshold used for character boundary judgment is calculated (Step 4). More specifically, in the threshold calculation section 13d of the data processing unit 13 all the positive peaks contained in the orthogonal projection data are detected and a histogram of positive peaks is created (imaginary idea on the memory); then, in this positive peak histogram, cumulative frequency from the maximum value to the minimum value is obtained, and the point at which the cumulative frequency exceeds the assumed number of characters is detected, and the peak value of the point is used as the threshold.

Figure 7:
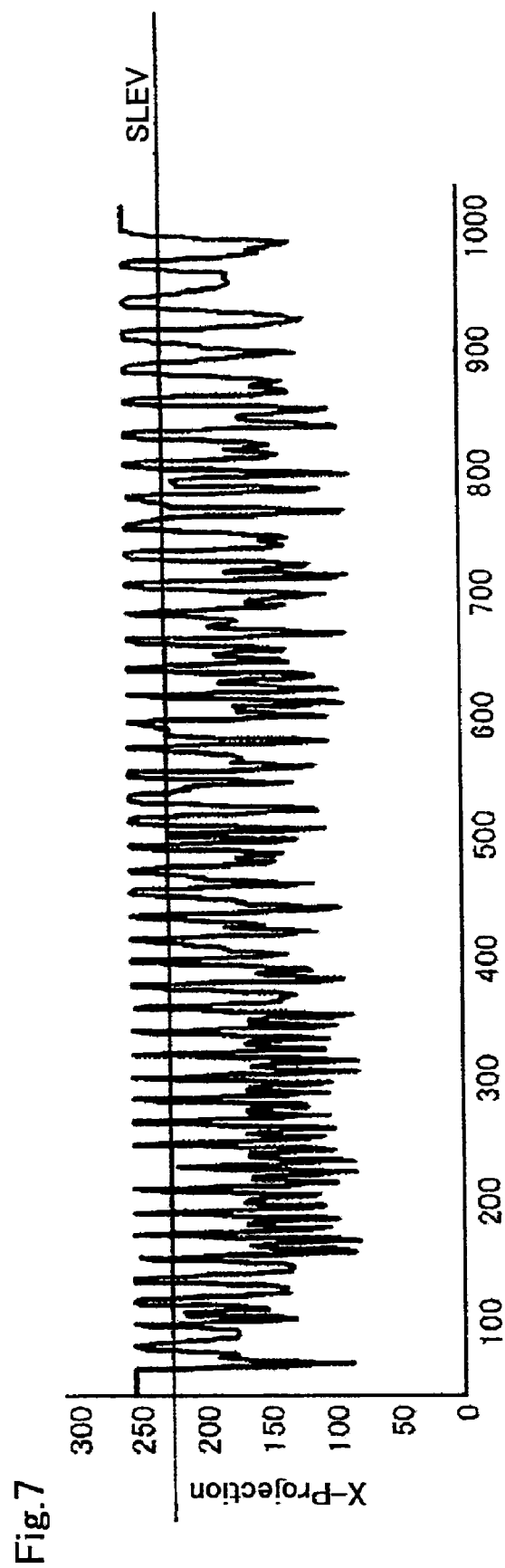
FIG. 7 is an orthogonal projection result (example) of the image data of FIG. 3.
Figure 8:
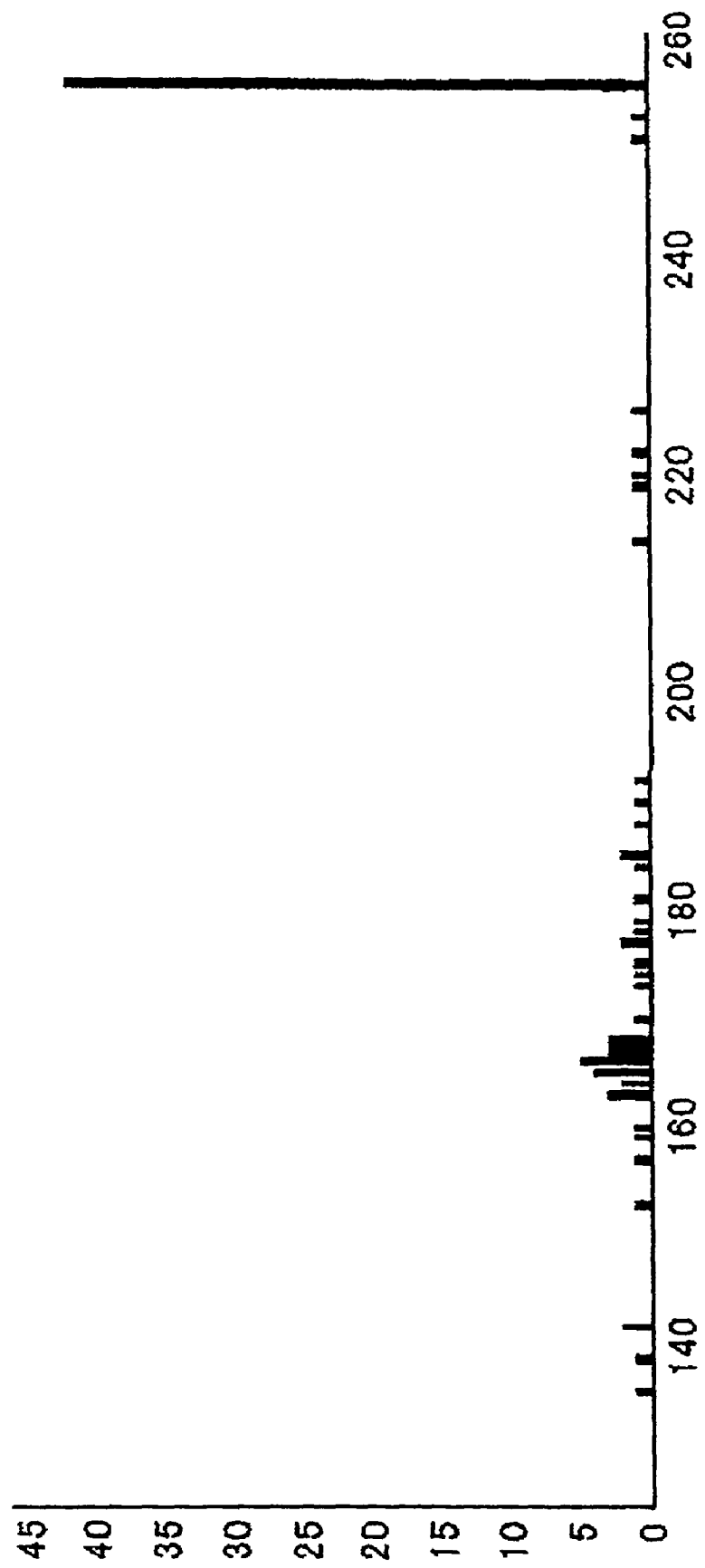
Figure 9:
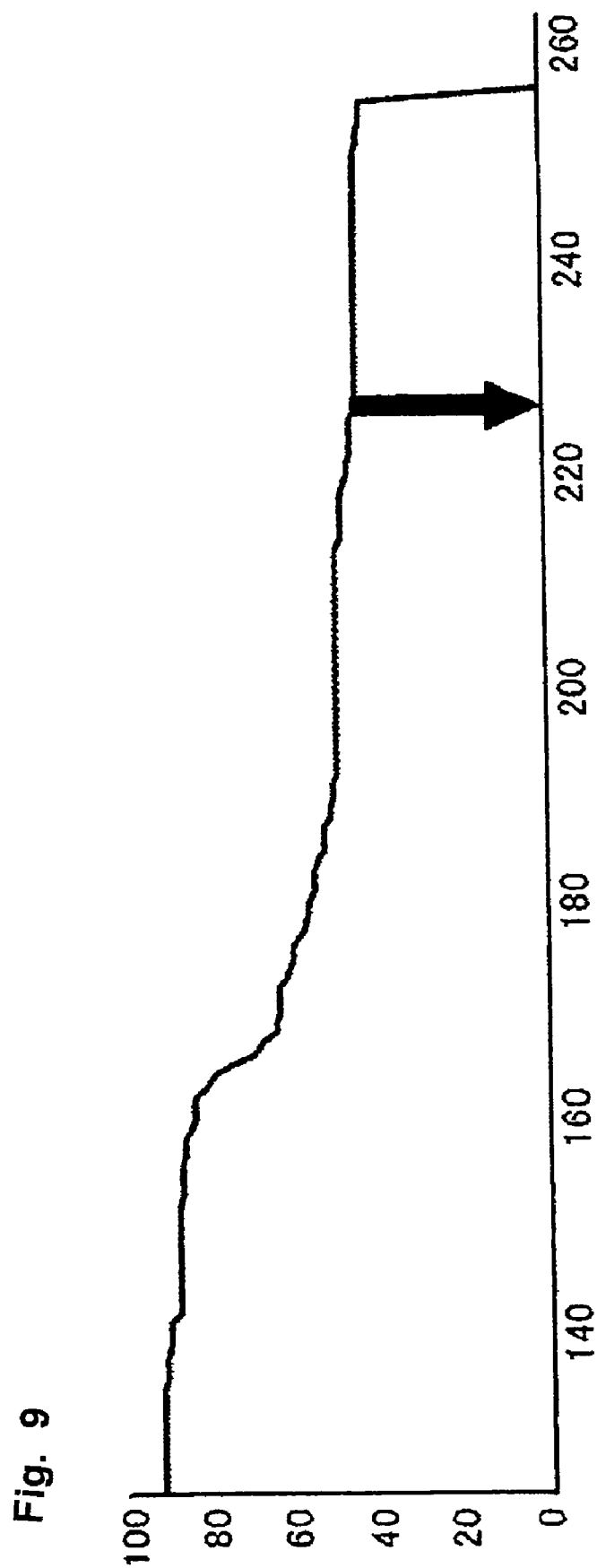
FIG. 9 is a graph of cumulative frequency in the direction from the maximum value to the minimum value in the histogram of FIG. 8.

An example of Step 4 is described referring to FIG. 7 through FIG. 9. FIG. 7 shows the result (the example) of the orthogonal projection of the image data shown in FIG. 3. FIG. 8 is a histogram of positive peaks in the orthogonal projection image shown in FIG. 7 (the frequency of positive peaks above the predetermined peak value). FIG. 9 shows a cumulative frequency in the direction from the maximum peak value to the minimum value (a cumulative frequency of the peaks above the predetermined peak value). Note that, in FIG. 8, the horizontal axis is for the predetermined peak values and the vertical axis is for the frequency, and in FIG. 9, the horizontal axis is for predetermined peak values and the vertical axis is for the cumulative frequency.

According to FIG. 8, there are five peak values around 220 in total while most of the peak values are condensed around 255. According to FIG. 9, (when following the line in the graph from the right end to the left end), the cumulative frequency of the positive peak values suddenly increases around 255; then as the peak value becomes smaller, the increase of the cumulative frequency slows.

Suppose that the number of characters that need to be recognized is 44: the peak value at the point where the cumulative frequency is above 44, that is the peak value, 225, at the point where the cumulative frequency is 45 (=the number of the characters to be recognized +1), is the boundary judgment threshold (SLEV in FIG. 7). In this embodiment, the boundary judgment threshold is the peak value corresponding to the number which results from adding 1 to the number of the characters composing the character line when the positive peak values contained in the orthogonal projection data are laid out in the order of the highest number and counted from the highest peak value.

Next, the character boundary determination (the character boundary detection) processing is performed (Step S5). More specifically described, in the character boundary determination section 13e of the data processing unit 13, the level value of the projection profile is compared with the boundary judgment threshold obtained in Step S4 to determine the interval in which the level is above the boundary judgment threshold as the space between the characters (to determine the character boundaries). Note that the mid point between the side edges of the interval in which the level is above SLEV, for example, may be determined as the boundary position. Step S5 is an example of "the "segmenting-position detection step" in which the positions where the orthogonal projection data obtained in Step S4 is above the predetermined boundary judgment threshold are determined as the segmenting positions of the characters composing the character line.

Figure 10:
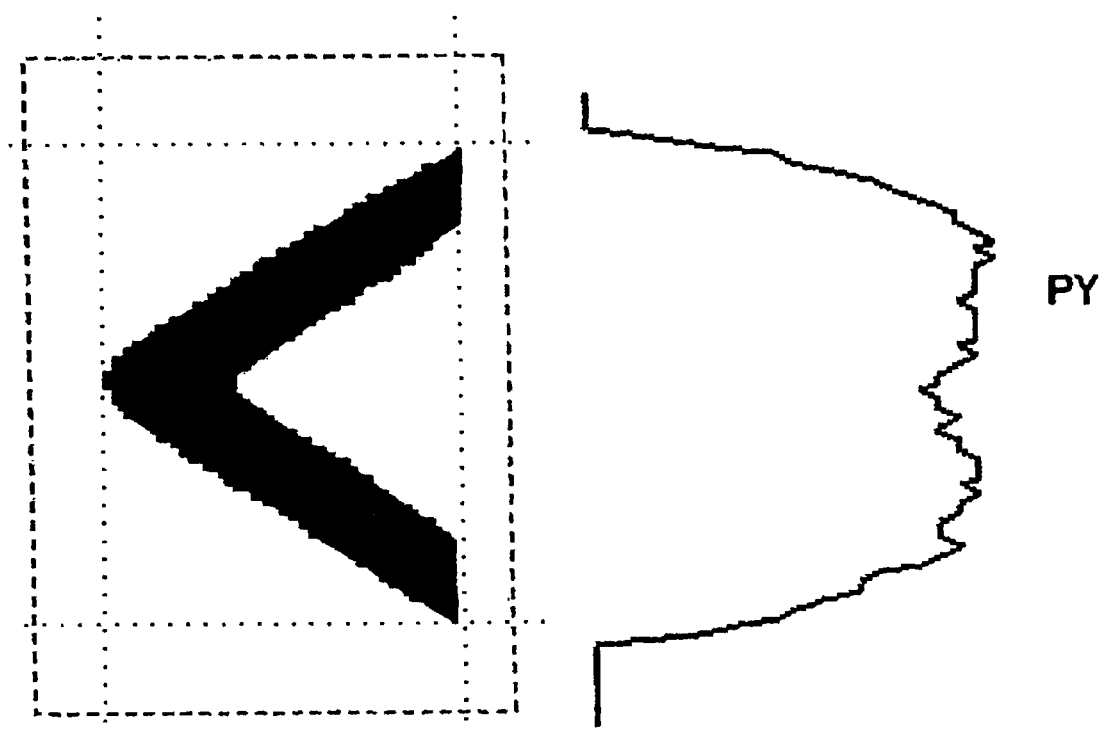
FIG. 10 is the image data of the character, "<", part of the character line.
Figure 10:
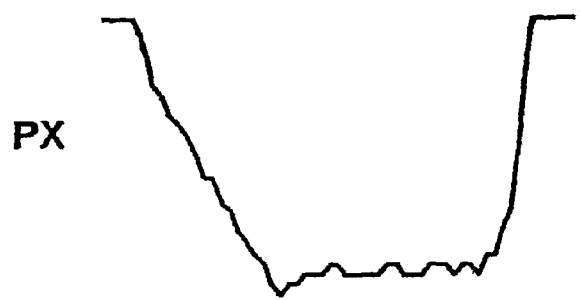

When the left and right boundary positions for each character are temporarily determined through the processing of Step S5 in this manner, the characters inside the rectangular areas are obtained as shown in FIG. 10. FIG. 10 is a diagram of the image data of the character "<", one of the components of the character line.

Referring to FIG. 10, to accurately specify the position of the "<" character, the orthogonal projection PX and the horizontal projection PY are calculated. Along the obtained PX, the left and right boundary positions of the character are detected; PX is scanned in the right direction having the point on the left edge of the rectangle area as the starting point; if its level (the detection of the pixels) is continuously below the threshold for a given number of times (three times, for example), the position at which the level is below the threshold for the first time is determined as the left edge of the character. Then, in the same manner, PX is scanned in the left direction having the point of the right edge of the rectangle area as the starting point; if the level (the detection of the pixels) is continuously below the threshold for a given number of times, the position at which the level is below the threshold for the first time is determined as the right edge of the character.

A processing step is performed on the horizontal projection PY in the same manner having the range segmented between the left edge position and the right edge position obtained in the boundary determination processing as a defined range; the upper and lower edges of the rectangular area are scanned from the outside of the thinner dotted-lines; when each level is continuously below the threshold for a given number of times, the positions at which the level value becomes below the threshold for the first time are determined as the upper and lower edges of the character. In this manner, the character positions in the character line are specified so that the character segmentation (Step S6) can be performed. Note that Step S6 is an example of the "bounding rectangle calculation step" in which the rectangle bounding the character (the portion bounded by four dotted-lines in FIG. 10) is obtained based on the character segmentation positions detected in Step S5. Since the rectangles bounding the character are obtained in the above manner, when the next processing is performed for calculating the similarity with respect to the standard character features, error (caused by extra space) can be reduced, thus increasing the accuracy of the character recognition.

Next, the feature extraction is performed (Step S7). More specifically described, in the feature extraction section 13g of the data processing unit 13, the above-described bounding rectangle area is divided into arbitrary sub regions (for example, one bounding rectangular area is divided into 5×5 regions which are designated as sub regions); in each sub region the ratio of the number of black pixels to the total number of all the pixels is obtained, and a feature vector comprising the elements (the percent rate of the black pixels) is created.

Next, the feature comparison is performed (Step S8). More specifically described, in the feature comparison section 13h of the data processing unit 13, the feature vectors obtained in Step S7 are compared with the standard feature vectors which have been obtained in advance for all the characters used in the recording carrier 2 (that is, the standard characters registered in the dictionary) to obtain similarity (such as a normalized correlation coefficient). Then, the character judgment is performed in which the characters having the highest similarity are selected as the candidates for the characters (Step S9).

The standard feature vectors are saved in advance in the feature dictionary storage section 13i; when the feature comparison is performed, the feature vectors are read out from the feature dictionary storage section 13i to the feature comparison section 13h to perform a feature comparison with respect to the character data in the rectangle to be compared (the feature vectors obtained in Step S7). Note that Step S7 and Step S8 are an example of the "similarity calculation step" in which the character features in the rectangle segmented in Step S6 are extracted and compared with the standard character features to calculate similarity.

In the character judgment (Step S9), the character candidates which are determined based on the similarity obtained through the feature comparison in Step S8 are recognized as the characters used in the recording carrier 2. Step S9 is an example of the "temporary character judgment step" in which characters are temporarily judged based on their similarity.

When characters having a specific value or more of the similarity are determined as character candidates, there are some cases where only one character is found to be a candidate and other cases where a few characters are found to be candidates. For example, when there are a plurality of character candidates with similarity above a specific value (0.6, for example), the character having the highest similarity is temporarily determined to be the correct character. Then, the highest value of similarity of the temporarily determined character, that is the similarity of the character candidate, is defined as a score. Note that the similarity and the score value are 1.0 when the feature vector of the character candidate and the standard feature vector coincide with each other completely, and they are expressed by the number 0 or larger.

When there is no significant difference in the similarities of a plurality of character candidates and therefore the character recognition cannot be accomplished, a secondary feature which can be pulled out from the feature vector may be used to judge the similar characters for determining a temporarily determined character.

For example, the arbitrarily-divided sub regions may be grouped about the bilateral symmetry into two groups (the left half and the right half) and partial feature vectors are composed to study the similarity between them; in the same manner, [the sub regions] are grouped about the diphycercal symmetry into two groups (the top half and the bottom half) to study similarity. Also, similarity may be studied with point symmetry in the same manner as the bilateral symmetry and the diphycercal symmetry.

Further, since three kinds of shape features are obtained for one character; the appropriate character may be found according to the interrelation of those values. However, there may still be a case that they cannot be differentiated. For example, it may be difficult to judge 'O' from '0' depending on the font type used on the recording carrier 2. In this case, it can be judged by studying the difference in the height of the characters or difference in the curvature of four corners.

In the character line recognition method of this embodiment, after a series of character judgment processing steps up to Step S9 is completed, the rerun judgment processing is performed in the rerun judgment section 13k. The processing inside the dotted-line frame in FIG. 2, that is Step S13 and the processing prior to S13, corresponds to the rerun judgment processing. Note that the processing up to Step S9 are for the improvement of the accuracy of "character recognition" of each individual character while the processing from Step S10 on are for the improvement of the accuracy of the overall "character line recognition", looking at the entire character line.

In the rerun judgment processing, paying attention to the fact that the similarity and the score are improved or degraded when the binarization standard threshold is changed and considering error factors, i.e., the classification of the recognition result into the evaluation categories (which will be described later), the binarization standard threshold is changed by a specific method so as to improve the accuracy of the character recognition. In other words, in this rerun judgment processing, the character line recognition result is classified into one of a plurality of evaluation categories by error factors; based on the evaluation category in which the recognition result is classified, it is determined if the processing need to be rerun, and at the same time the increase or decrease of the binarization standard threshold which will be applied in the rerun (Step S1 through S13) in the next cycle, is determined.

Characteristics of the binarization standard threshold which are essential will be described hereinafter. Generally, when the binarization standard threshold is relatively low, the letter line in the binary format image is thin; on the other hand, when it is relatively high, the letter line is thick. If the thickness of the letter line is very different from the letter thickness of the standard character image, only small similarity is obtained in the feature comparison processing (Step S8), and therefore, the score will be 0.5, for example, which is very small. When the binarization standard threshold is suitable, the similarity, that is the score, will be a relatively great value such as 0.9. In other words, it is highly possible to obtain a correct character. Then, in this embodiment, the binarization standard threshold is changed so as to improve the similarity and the score and to increase the accuracy of the character recognition.

Described next is a plurality of evaluation categories which are prepared based on the error factors in order to evaluate the character line recognition result. In this embodiment, the character line recognition result is classified into one of the categories 1 through 4 in the following manner. Note that the error factor here includes the factors of error and the degree of the influence of these factors on the character recognition.

The first evaluation category (Category 1) suggests a relatively critical error (a so-called hard error) in that the processing needs to be stopped before the completion of the character recognition. More specifically described, if the characters are correctly printed on the recording carrier 2 and the image is scanned under an appropriate luminance condition, the recognition process can be correctly performed on every character. However, when the printing ink [lit: color] of the characters on the recording carrier 2 is too light or the transport speed of the medium (the recording carrier 2) is too fast, the character recognition cannot be performed because character segmentations cannot be performed correctly. Such errors are classified as the first evaluation category.

The second evaluation category (Category 2) suggests a relatively minor error (a so-called soft error) in which, although there is no hard error, but error is found in the character recognition result, and the correct character recognition cannot be accomplished. The soft error is a character error that occurs when the similarity of the temporarily judged character in Step S8, that is the score, is a low value that doe not reach a predetermined standard (0.6, for example) or when the recognized character is judged to be a character different from the correct character to be recognized. The soft error is classified as the second evaluation category. Note that a predetermined standard of the score is denoted for the score judgment threshold.

Also, the third evaluation category (Category 3) suggests a case in that a soft error did not occur but a relatively small value exists in the scores of the temporarily judged characters composing the character line to be recognized. This corresponds to a case in which the letter line of a particular character is locally too thick or too thin due to uneven illumination, irregular speed, etc. Further, the fourth evaluation category (Category 4) suggests a case in which there is no soft error and the score of every temporarily judged character is also above the score judgment threshold.

Described next is how the character line recognition result is classified into one of the categories, referring to FIG. 2. First, when the character recognition cannot be accomplished because of hard error which is Category 1, it is determined that the character boundary detection in Step S5 has failed (Step S5a: NO) and the process is moved to a processing step for changing the binarization standard threshold (Step S13). Also, when the character boundary detection is successful (Step S5a: YES), the process proceeds to the next step, the character segmentation (Step S6). Note that even when the line segmentation (Step S2) has failed, it may be regarded as a hard error in the same manner and the process is moved to the Step S13.

A soft error which is Category 2 is determined when a character line is created with the characters determined in the temporary character judgment step (S9) and the character line is checked by a checksum method. More specifically described, the total of the given values (like check codes) of all the characters in the character line which are composed of the characters obtained in the temporary character judgment step are compared with a check digit given to the character line in advance (the total number of the characters in the correct character line); when the numbers disagree (Step S9: NO), the process proceeds to Step S13 in which the binarization standard threshold is changed. Also, when a soft error is not detected (Step S9a: YES), the process proceeds to Step S10 in which a score statistical processing, which is described later, is performed.

When there is neither a hard error nor a soft error and the evaluation is neither Category 1 nor Category 2, which means the evaluation is Category 3 or 4, the score statistical processing is performed (Step S10). More specifically described, as a standard to judge the character line recognition result, the total number, the maximum, the minimum, the median, the standard deviation, and the dispersion of the scores of the characters to be identified which are contained in the image to be recognized (in other words, the similarity of the temporarily judged characters composing the character line to be recognized) are calculated. The total number, the maximum, the minimum, the mean, the standard deviation, and the dispersion of the scores are examples of the basic statistics. Note that the score statistical processing (Step S10) is an example of the "basic statistical calculation step" in which the basic statistics of the similarity (the score) of all the characters temporarily judged in the character judgment processing of Step S9 are calculated.

Next, Step S11 is performed in which the character line recognition result is evaluated based on the basic statistics of the scores obtained in Step S10. In Step S11, the recognition result is classified into Category 3 or Category 4. More specifically described, an arbitrary threshold given in advance based on the experiments and experience according to the kind of the basic statistics to be used is compared with the basic statistics to determine in which category the recognition result may be classified. A specific example is described later.

When the evaluation result obtained in Step S11 is not appropriate (Step S11: NO), the recognition result is regarded as Category 3; the processing step of changing the binarization standard threshold is performed (Step S13), and with the newly changed binarization standard threshold, the process returns to Step S1 in which the binarization standard processing is performed. The series of feedback of Step S11→Step S13→Step S1 corresponds to the "process-returning step" in which the binarization standard threshold is changed based on the basic statistics calculated in the score statistical processing in Step S10 and then the process is returned to Step S1.

On the other hand, when the evaluation result obtained in Step S11 is appropriate (Step 311: YES), which means that the recognition result is Category 4 where there is neither a hard error nor a soft error and the score of every temporarily judged character is above the score judgment threshold, the judgment result is confirmed at this stage (Step S12) and the process ends.

Figure 11:
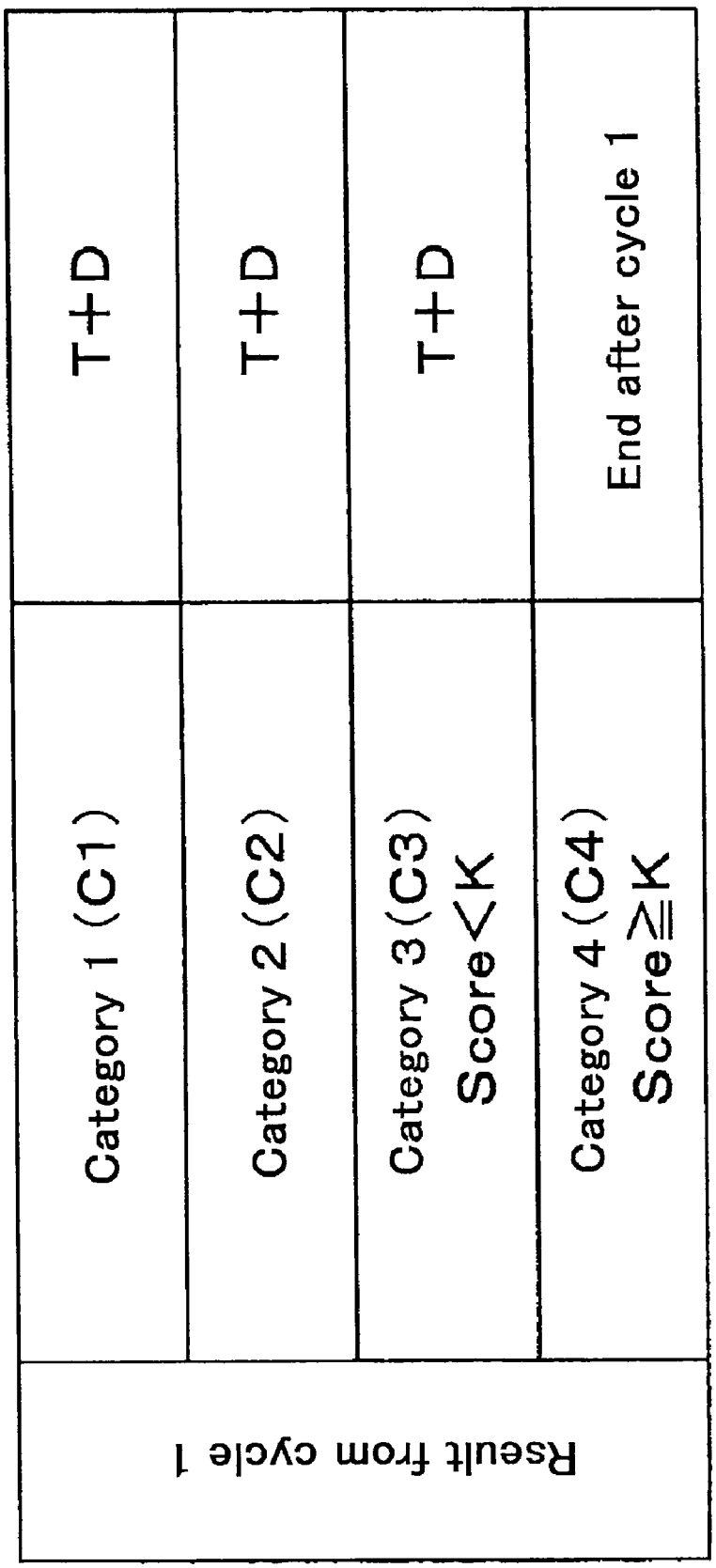
FIG. 11 is an explanatory table to explain how the binarization standard threshold is changed based on a plurality of evaluation categories in the first cycle.

Next described is Step S13 in which the binarization standard threshold is changed based on the character line recognition result obtained in Step Sit In this embodiment, the minimum value of the scores is used as the basic statistics of the scores. FIG. 11 is an explanatory table to explain (logic) that the binarization standard threshold is changed depending on the evaluation categories in the first cycle (Cycle 1). FIG. 12 is explanatory tables for the second and subsequent cycles (Cycles 2 and 3). Note that Category is expressed by the letter, C (Category 1 is expressed by C1, for example). Also, T represents the binarization standard threshold of the first cycle (the series of processing steps from Step S1 to Step S9 in FIG. 2), and D represents the amount of change (arbitrary value) of the binarization standard threshold.

The result of Cycle 1 is classified into one of the Categories 1 through 4 (C1 through C4) as shown in the table in FIG. 11, based on the judgment in the aforementioned Steps S5a, S9a and S11. In other words, Category 1 is the case in which the aforementioned Step S5a results in NO, a hard error is indicated, and the number of the characters is not enough. Category 2 is the case in which the aforementioned Step S9a results in NO, a soft error is indicated, and the character error has occurred, for example. Category 3 is the case in which the aforementioned step S1l results in NO, neither a hard error nor a soft error is indicated, but relatively small values exist in the scores of the temporarily judged characters, lacking reliability. Category 4 is the case in which neither a hard error nor a soft error is indicated, there is no relatively small value in the scores, and thus reliability can be assured.

Specific examples of Category 3 and Category 4 are described hereinafter. In FIG. 11, an arbitrary threshold, K, is set (for example, 0.8). This K is the value obtained in advance based on experiments and experience. Also, SCORE represents the basic statistics of the scores obtained in Slap S10. Therefore, the arbitrary threshold (K) and the basic statistics (SCORE) are compared to each other to judge in which category, Category 3 or Category 4, the recognition result will be classified. In other words, when the scores of the characters to be recognized which are contained in the image to be recognized (the similarity of the temporarily judged characters composing the character line to be recognized) are above the arbitrary threshold, K, the result is judged as Category 4; when it is below the arbitrary threshold, K, the result is judged as Category 3. Note that, in this embodiment, the minimum value of the scores is used as the basic statistics of the scores, and the arbitrary threshold, K, and the aforementioned score judgment threshold are regarded as substantially the same value to simplify the processing.

Next, it is appointed in Category 1 through Category 3 shown in FIG. 11 that the binarization standard threshold in the next cycle (Cycle 2) will be changed to T+D. In the case of Category 4, the process ends with Cycle 1 as described above. Note that, although D can be negative, its condition here is D>0. The binarization standard threshold in the next cycle is appointed to T+D as described above because it is not apparent whether or not the judgment result gets better by changing the binarization standard threshold, T, to the new binarization standard threshold, T+D. In this manner, a series of processing (Cycle 2), starting from the second-time binarization processing (Step S1), is performed after the completion of Cycle 1, based on the new result obtained by changing the binarization standard threshold to T+D.

Described next referring to FIG. 12 is an explanation of how the binarization standard threshold is changed based on the evaluation categories in the second and subsequent cycles (Cycles 2 and 3). Note that the "processing code" means a symbol expressing the current processing status which is determined by the results obtained up to Cycle 2, and is expressed by the letter, Q. SCORE 1 represents the basic statistics calculated in Cycle 1, and in the same manner, SCORE 2 and 3 represent the basic statistics calculated in Cycles 2 and 3.

FIG. 12 (a) shows that the binarization standard threshold is changed under the condition after Cycle 2 is completed, based on the combination of the result from Cycle 1 and the result from Cycle 2, which is the current processing status. For example, when the judgment result from the Cycle 1 is Category 1 and the judgment result from the Cycle 2 is Category 2, it indicates that the judgment result has changed in an appropriate direction because the binarization standard threshold, T, is changed to T+D (Category 2 is better than Category 1 as a judgment result); therefore, the binarization standard threshold, T, is changed to T+2D and then the next cycle which is the third cycle is performed. To this processing, the processing code Q21 is assigned. Note that the detail of the classification of the recognition result into Category 1 through Category 4 in Cycle 2 remains the same as in Cycle 1.

When the result from Cycle 2 is Category 4, it indicates that the minimum score (SCORE 2) as the basic statistics is above the arbitrary threshold, K (the score judgment threshold); therefore, it is determined that the result is suitable (Step S11 in FIG. 2: YES), the judgment result is confirmed in this step (Step S12 in FIG. 12), and then the processing ends. With this, the judgment result of the characters which have been temporarily judged in Step S9 is confirmed. Note that, when the result from Cycle 1 is Category 4, the processing up to Step S12 has been completed in the previous cycle and [the results for Category 4] in FIG. 12 are blank.

Next, FIG. 12 (b) shows the result from which cycle is adopted in the end according to the processing status up to Cycle 2 (the processing codes) and the result from the third cycle (Cycle 3). For example, suppose that, in the case having the processing code, Q21, in Cycle 2, the result from Cycle 3 is Category 2. This means that the results from both the first and second cycles were Category 2; then, the result from either second or third cycle is selected. It may be determined which result is selected, by the relative sizes between the minimum scores, SCORE 2 and SCORE 3, as the basic statistics. For example, when SCORE 3≧SCORE 2, the characters and the character line based on the judgment result from Cycle 3 are adopted.

Describing another example, a case which the judgment result from the first cycle (Cycle 1) was Category 3 is given (a case of C3 in FIG. 11). In this case, although there is no apparent error (there is no soft error), the minimum value of the scores as the basic statistics is below the arbitrary threshold, K (the score judgment threshold), and therefore, reliability is insufficient. Accordingly, the binarization standard threshold is changed from T to T+D to perform the second cycle (Cycle 2) (C3 in FIG. 11). When the result from Cycle 2 is still Category 3, the increase or decrease in the minimum value of the scores is paid attention; when the minimum value of the scores is increased (the basic statistics have been improved), the binarization standard threshold is changed from T to T+2D and the third cycle (Cycle 3) is performed (at that time, the processing code is Q33). On the other hand, when the minimum value of the scores is not increased (the basic statistics have not been improved), the binarization standard threshold is changed from T to T-D and the third cycle (Cycle 3) is performed (at that time, the processing code is Q34).

As described above, in this embodiment, the binarization standard threshold is changed so as to increase the minimum value of the scores as the basic statistics calculated in the score statistics processing of Step S10, based on the four classified evaluation categories (Category 1 through Category 4).

Note that, although the cycle is performed a maximum of three times in this embodiment, the number of times the cycle is performed may be increased if there is extra processing time.

Major Effects of Embodiment

As described above, in the character line recognition device in which a character line composed by a known number of characters printed in a known position on a medium is scanned primarily by the 1D pickup device 11, scanned secondarily by a manual or mechanically-driven medium moving body and converted to 2-D image data, and the image data is appropriately processed to recognize the character line, the character line recognition method of this embodiment recognizes the character line by a series of steps including Step 1 in which the multi-format image obtained by scanning the medium is binarized, Step S4 in which in order to detect the character segmentation positions in the character line along the direction in which the medium is moved, the boundary judgment threshold is calculated for determining the character boundaries based on the projection, Step S5 in which the character boundaries are determined based on the boundary judgment threshold, Step S6 in which the rectangle bounding each character is obtained based on the character boundary, Step S7 in which the character features in the bounding rectangle are extracted, Step S8 in which the similarity is calculated with respect to the features of the standard characters registered in dictionary, and Step S9 in which the characters having the highest similarity are judged as the character candidates; further, a processing path (Steps SW, S11, S13) is provided to rerun the binarization of the medium image and the character recognition based on the recognition result data of the character line including the basic statistics of the scores which is the similarity of all the recognized characters. Therefore, the accuracy of the character line recognition can be improved. As a result, reliability for the recognition result of the character line recognition can be increased. In other words, by using the basic statistics of the scores, the accuracy of the recognition of the entire character line, not just the individual character, can be improved.

Further, in the character line recognition method of this embodiment, the recognition result data of the character line includes the levels of errors that have occurred during the character line recognition (the classifications of the evaluation categories according to the errors); therefore, the accuracy of the character line recognition can be further increased. Also, the judgment on whether another cycle needs to be performed or not is carried out according to the classification of the judgment result into the evaluation categories (Category 1 through Category 4), which is the level of the error that has occurred during the recognition, and the basic statistics of the scores; therefore, an evaluation category table (such as FIG. 11 and FIG. 12) is created in advance for an accurate the character line recognition.

Another Embodiment

In the embodiment described referring to FIG. 11 and FIG. 12, the minimum value of the scores is used as the basic statistics which is the standard for a reliability judgment to obtain the judgment result on the character line; however, the variance, standard deviation, maxima, mean and deviation of the scores, or the total number of the scores (the frequency) may be appropriately selected and used. According to the characteristics of the selected statistics, the binarization standard threshold (T) is changed (D is increased or decreased) so as to improve the characteristics, and then the process proceeds to the "processing-returning step" in which the process is returned to Step S1 to perform the second and subsequent cycles. More specifically described, when the variance or standard deviation is adopted for the basic statistics, the binarization standard threshold is so changed that the variance or the standard deviation becomes smaller; in this manner, the basic statistics is improved.

Described next is how the binarization standard threshold is changed based on the evaluation categories when the standard deviation is used as the basic statistics of the scores. FIG. 13 is an example of an evaluation category table showing the binarization standard threshold and the processing codes, in which the standard deviation is used for the basic statistics. In FIG. 13, the same elements and parameters as those in FIG. 12 are given the same codes as in FIG. 12. FIG. 13 is different from FIG. 12 in that the standard deviation of the scores is used as the basic statistics. Therefore, the size relationship between the standard deviation as the basic statistics (SCORE 1, SCORE 2, SCORE 3) and the arbitrary threshold, K, which are used to classify the result into Category 3 or Category 4, are opposite in FIG. 12 and FIG. 13. The threshold, K, and the score judgment threshold in the embodiment of FIG. 12 are substantially the same (the sane kind of) coefficient; however, the threshold, K, in FIG. 13 is a threshold obtained in advance based on the experiments and experience on the standard deviation, different from the aforementioned score judgment threshold. Therefore, the classification of the result into Category 3 or Category 4 in the embodiment of FIG. 13 is performed when the similarity, i.e., the score of the temporarily judged character in Step S8 is above the score judgment threshold (0.6, for example), that is when there is no soft error and the result is not the second evaluation category (Category 2). Its specific example is described next.

In FIG. 13 (*a*), SCORE 1 indicates the standard deviation of the scores as the basic statistics in Cycle 1; therefore, when SCORE 1 is larger than the threshold, K, (Score 1>K), it is judged that dispersion is remarkably large and reliability is low and the result is classified as Category 3, and when the process is returned to Step S1 in the "process-returning step", Cycle 2 is performed. On the other hand, when the score is not larger than the threshold, K, (Score 1≦K), the result is classified as Category 4, and it is determined that the result of Cycle 1 is effective, and the process ends there.

In Cycle 2, SCORE 2 indicates the standard deviation of the scores as the basic statistics of Cycle 2; therefore, when Score 2>K, the result is classified as Category 3; under the condition that SCORE 2≦SCORE 1 (the processing code Q33), the threshold is changed to T+2D and the next cycle (Cycle 3) is performed, when SCORE 2>SCORE 1 (the processing code Q34), the threshold is changed to T-D and the next cycle (Cycle 3) is performed.

FIG. 13 (*b*) is an evaluation category table showing the judgment on the results of Cycle 3 performed after the results (the processing codes) of Cycle 1 and Cycle 2. It is the same as FIG. 12 (*b*). For example, in the case where the processing status at the completion of Cycle 2 is the processing code Q11, when the result of Cycle 3 is Category 2, it indicates that the result of Cycle 3 will be adopted. In this manner, according to the kinds of the basic statistics, an optimal evaluation category table can be used.

The following may be considered as another embodiment. For example, if the total number of the scores (frequency) is used as the basic statistics, when the total number of the scores does not reach a given number (that is the total number of the characters that should be contained in the character line), the result is determined to be a hard error because the number of characters is too few and the character line recognition result may be classified as Category 1. In this case, the minimum value of the scores is also used as the basic statistics to omit Step S5a in the flow of FIG. 2.

Another embodiment may be performed in the following manner. When the minimum value of the scores as the basic statistics does not reach the score judgment threshold such as 0.6, the result is determined to be a soft error or character error, the character line recognition result is classified as Category 2 and the step S9 may be omitted.

In this manner, in the embodiments of the present invention, the variance, the standard deviation, the minimum, the maximum, the mean and the dispersion, and the total number (the frequency) of the scores are used individually or combined as the basic statistics and used as the standard for the reliability judgment to obtain the judgment results of the character line; therefore, the binarization standard threshold can be set based on the parameter reflecting reading reliability of the entire area to be recognized, thus easily increasing the accuracy of the character line recognition.

Further, the binarization standard threshold is changed so as to improve the basic statistics of the scores; therefore, the binarization standard threshold can be appropriately changed through a simple process. For example, when the minimum value is used as the basic statistics, the number is operated as follows: if the basic statistics are increased, it determines improvement and therefore the binarization standard threshold is increased; if the basic statistics are decreased, it determines no improvement and the binarization standard threshold is changed in the opposite direction (decreased).

Note that, although the 1D pickup device 11 and the linear transport mechanism are used in the embodiments, the present invention is not limited to these. For example, a combination between an area sensor such as 2D CCD and CMOS imager and an object support mechanism may be used. Also, the present invention can be applied not only to print characters but also to hand-written characters as a subject to be recognized. Further, the present invention can be applied not only to character recognition but also to decoding of 1D and 2D barcodes. The deviation of the binarization standard threshold is expressed by D unit such as T+D and T+2D; however, the coefficient may be adjusted to +1.5D and +2D to provide a flexible setting depending on implementation. Although the number of times of re-run is three times at a maximum, it may be increased as long as the processing time allows.

POSSIBILITY OF INDUSTRIAL USE

The character line recognition method and the character line recognition device of the present invention are useful to increase reliability for character line recognition.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character line recognition method for processing image data obtained by scanning a character line on a medium to recognize the character line, the method comprising:
    processing the image data into monochrome binary format image data by using a predetermined binarization standard threshold;
    calculating an orthogonal projection of the binary format image data in a direction orthogonal to a direction of the character line while shifting along the binary format image data in the direction of the character line;
    detecting positions at which orthogonal projection data obtained in the calculating an orthogonal projection are above a predetermined boundary judgment threshold as segmenting-positions for segmenting the characters that compose the character line;
    obtaining rectangles bounding the characters based on the segmenting-positions detected in the detecting positions;
    extracting character features from each character that composes the character line to calculate similarity with respect to standard character features;
    temporarily determining characters based on the similarity;
    calculating basic statistics of the similarity for all the characters which have been temporarily determined; and
    changing the binarization standard threshold based on the basic statistics and then returning to the processing the image data;
    wherein the extracting character features extracts character features in the rectangles and calculates similarity with respect to standard character features.

2. The character line recognition method as set forth in claim 1, wherein the changing the binarization standard threshold classifies a recognition result into one of a plurality of evaluation categories based on the basic statistics, and changes the binarization standard threshold based on the evaluation category in which the recognition result is classified.

3. The character line recognition method as set forth in claim 2, wherein the changing the binarization standard threshold, having a minimum value of the similarity as the basic statistics, classifies the recognition result into one of the evaluation categories according to the minimum value.

4. The character line recognition method as set forth in claim 1, wherein the changing the binarization standard threshold changes the binarization standard threshold so as to improve the basic statistics.

5. A character line recognition method for processing image data obtained by scanning a character line on a medium to recognize the character line, the method comprising:
    processing the image data into monochrome binary format image data by using a predetermined binarization standard threshold;
    calculating an orthogonal projection of the binary format image data in a direction orthogonal to a direction of the character line while shifting along the binary format image data in the direction of the character line;
    detecting positions at which orthogonal projection data obtained in the calculating an orthogonal projection are above a predetermined boundary judgment threshold as segmenting-positions for segmenting the characters that compose the character line;

obtaining rectangles bounding the characters based on the segmenting-positions detected. in the detecting positions;

extracting character features from each character composing the character line to calculate similarity with respect to standard character features;

temporarily determining characters based on the similarity;

classifying a recognition result of the entire character line, which includes all the characters temporarily determined, into one of a plurality of evaluation categories; and changing the binarization standard threshold based on the evaluation category in which the recognition result is classified and then returning to the processing the image data;

wherein the extracting character features extracts character features in the rectangles and calculates similarity with respect to standard character features.

6. The character line recognition method as set forth in claim 5, wherein the changing the binarization standard threshold changes the binarization standard threshold to be used in re-processing, based on results from the repeated extracting character features and temporarily determining characters, so as to improve the recognition result of the entire character line.

7. The character line recognition method as set forth in claim 5, further comprising:

calculating basic statistics of the similarity on all the characters which have been temporarily determined;

wherein the changing the binarization standard threshold changes the binarization standard threshold based on the evaluation category in which a result is classified in the classifying the recognition result and on the basic statistics calculated.

8. The character line recognition method as set forth in claim 7, wherein the changing the binarization standard threshold changes the binarization standard threshold so as to improve the basic statistics.

9. A character line recognition device equipped with a character line recognition means to recognize a character line on a medium by using the character line recognition method as set forth in claim 1.

10. A character line recognition device equipped with a character line recognition means to recognize a character line on a medium by using the character line recognition method as set forth in claim 5.

* * * * *